US009105144B2

(12) United States Patent
Baric

(10) Patent No.: US 9,105,144 B2
(45) Date of Patent: Aug. 11, 2015

(54) MULTIPLE-SIDED VENDING MACHINE

(76) Inventor: Robert J. Baric, Carey, NC (US)

( * ) Notice: Subject to any disclaimer, the term of this patent is extended or adjusted under 35 U.S.C. 154(b) by 0 days.

(21) Appl. No.: 13/398,487

(22) Filed: Feb. 16, 2012

(65) Prior Publication Data

US 2012/0150343 A1 Jun. 14, 2012

Related U.S. Application Data

(63) Continuation-in-part of application No. 13/004,308, filed on Jan. 11, 2011.

(60) Provisional application No. 61/294,348, filed on Jan. 12, 2010.

(51) Int. Cl.
*B65G 59/00* (2006.01)
*G07F 9/10* (2006.01)
*G07F 11/48* (2006.01)

(52) U.S. Cl.
CPC .. *G07F 9/10* (2013.01); *G07F 11/48* (2013.01)

(58) Field of Classification Search
CPC ........ G07F 11/48
USPC ........ 221/312 R, 261, 311
See application file for complete search history.

(56) References Cited

U.S. PATENT DOCUMENTS

| | | | | |
|---|---|---|---|---|
| 3,782,518 | A * | 1/1974 | Smith | 194/233 |
| 4,111,282 | A | 9/1978 | Vayda, Jr. | |
| 4,169,521 | A | 10/1979 | Vayda, Jr. | |
| 4,189,031 | A | 2/1980 | Vayda, Jr. | |
| 4,805,738 | A | 2/1989 | Vayda | |
| 5,113,974 | A | 5/1992 | Vayda | |
| 5,221,023 | A * | 6/1993 | Dubik | 221/1 |
| 5,270,943 | A | 12/1993 | Warn | |
| 5,493,315 | A | 2/1996 | Atchley | |
| 5,586,686 | A | 12/1996 | Bustos et al. | |
| 5,619,024 | A | 4/1997 | Kolls | |
| 5,637,845 | A | 6/1997 | Kolls | |
| 5,725,124 | A | 3/1998 | Bustos et al. | |
| 5,734,150 | A | 3/1998 | Brown et al. | |
| 5,753,899 | A | 5/1998 | Gomm et al. | |
| 5,798,931 | A | 8/1998 | Kaehler | |
| 5,816,443 | A | 10/1998 | Bustos | |
| D418,878 | S | 1/2000 | Donahue | |
| 6,073,840 | A | 6/2000 | Marion | |
| 6,116,505 | A | 9/2000 | Withrow | |
| 6,176,421 | B1 | 1/2001 | Royal, Jr. et al. | |
| 6,193,154 | B1 | 2/2001 | Phillips et al. | |
| 6,213,393 | B1 | 4/2001 | Streicher et al. | |
| 6,321,985 | B1 | 11/2001 | Kolls | |
| 6,364,206 | B1 | 4/2002 | Keohane | |
| 6,401,009 | B1 | 6/2002 | Chandonnet | |
| 6,527,176 | B2 | 3/2003 | Baric | |

(Continued)

FOREIGN PATENT DOCUMENTS

| | | | |
|---|---|---|---|
| JP | 2004246608 | A | 9/2004 |
| KR | 2009-0100712 | A | 9/2009 |

*Primary Examiner* — Michael K Collins

(74) *Attorney, Agent, or Firm* — Blank Rome LLP

(57) ABSTRACT

A vending machine has a housing with a first side and a second side opposite the first side. A first dispensing slot is located at the first side of the housing, and a second dispensing slot is located at the second side of the housing. A central product storage stores product to be dispensed from the vending machine. A product delivery system selectively delivers product from said product storage to the first dispensing slot and said second dispensing slot.

13 Claims, 14 Drawing Sheets

(56) References Cited

U.S. PATENT DOCUMENTS

| | | | | |
|---|---|---|---|---|
| 7,344,050 | B2 * | 3/2008 | Robrechts | 221/120 |
| 7,809,470 | B2 * | 10/2010 | Shoenfeld | 700/243 |
| 8,086,349 | B2 * | 12/2011 | Blust et al. | 700/232 |
| 8,095,236 | B2 * | 1/2012 | Rudy et al. | 700/238 |
| 8,392,019 | B2 * | 3/2013 | Segal et al. | 700/242 |
| 2004/0254676 | A1 * | 12/2004 | Blust et al. | 700/231 |
| 2007/0252003 | A1 * | 11/2007 | Goldring et al. | 235/381 |
| 2008/0262649 | A1 * | 10/2008 | Allinson et al. | 700/235 |
| 2009/0276087 | A1 * | 11/2009 | Murray et al. | 700/232 |
| 2010/0026807 | A1 | 2/2010 | Sæther et al. | |
| 2010/0262282 | A1 * | 10/2010 | Segal et al. | 700/241 |
| 2010/0306069 | A1 | 12/2010 | Austin et al. | |
| 2011/0153067 | A1 * | 6/2011 | Weinshenker | 700/232 |
| 2011/0153071 | A1 * | 6/2011 | Claessen | 700/234 |
| 2011/0172813 | A1 * | 7/2011 | Baric | 700/232 |
| 2012/0000927 | A1 * | 1/2012 | Carpentier et al. | 221/1 |
| 2013/0112702 | A1 * | 5/2013 | Roekens et al. | 221/1 |

* cited by examiner

MULTIPLE-SIDED VENDING MACHINE

RELATED APPLICATIONS

This application is a continuation-in-part of Ser. No. 13/004,308, filed Jan. 11, 2011, which claims the benefit of U.S. Provisional Application No. 61/294,348, filed Jan. 12, 2010, the entire contents of which are incorporated herein by reference.

BACKGROUND OF THE INVENTION

1. Field of the Invention

The present invention relates to a vending machine. More particularly, the present invention relates to a vending machine which can dispense product from more than one side, and especially for use at fueling stations.

2. Background of the Related Art

Collective payment systems have been developed for use at fueling stations, such as shown in U.S. Pat. No. 6,527,176 to Baric, U.S. Pat. No. 6,401,009 to Chandonnet, U.S. Pat. No. 6,364,206 to Keohane, U.S. Pat. No. 6,193,154 to Phillips, U.S. Pat. No. 6,116,505 to Withrow, and U.S. Pat. No. 5,493,315 to Atchley, the contents of which are hereby incorporated by reference. However, those systems are not directed to machines which dispense product, and do not provide machines which dispense product from more than a single dispenser or a single side of the vending machine.

SUMMARY OF THE INVENTION

Accordingly, it is an object of the invention to provide a vending machine which can be provided at or near a fuel pump. It is another object of the invention to provide a vending machine which has multiple dispensers. It is a further object of the invention to provide a vending machine which has multiple user interfaces. It is a further object of the invention to provide a vending machine which can dispense product from multiple sides.

A vending machine has a housing with a first side and a second side opposite the first side. A first dispensing slot is located at the first side of the housing, and a second dispensing slot is located at the second side of the housing. A central product storage stores product to be dispensed from the vending machine. A product delivery system selectively delivers product from said product storage to the first dispensing slot and said second dispensing slot.

These and other objects of the invention, as well as many of the intended advantages thereof, will become more readily apparent when reference is made to the following description, taken in conjunction with the accompanying drawings.

BRIEF DESCRIPTION OF THE FIGURES

Many aspects of the present invention can be better understood with reference to the accompanying drawings, which are part of the specification and represent exemplary embodiments of the present invention. The components in the drawings are not necessarily to scale, emphasis instead being placed upon illustrating the principles of the present invention.

FIG. 5(*b*) is a top plan view of the vending machine of FIG. 5(*a*) at a fuel station island;

FIG. 6(*b*) is a top plan view of the vending machine of FIG. 6(*a*) at a fuel station;

FIG. 13(*b*) is an enlarged view of the product delivery system of FIG. 13(*a*) where the product delivery system is a conveyor belt;

FIG. 13(*c*) is an enlarged view of the product delivery system of FIG. 13(*a*) where the product delivery system is a sweep mechanism.

DETAILED DESCRIPTION OF THE PREFERRED EMBODIMENTS

Figure 1:
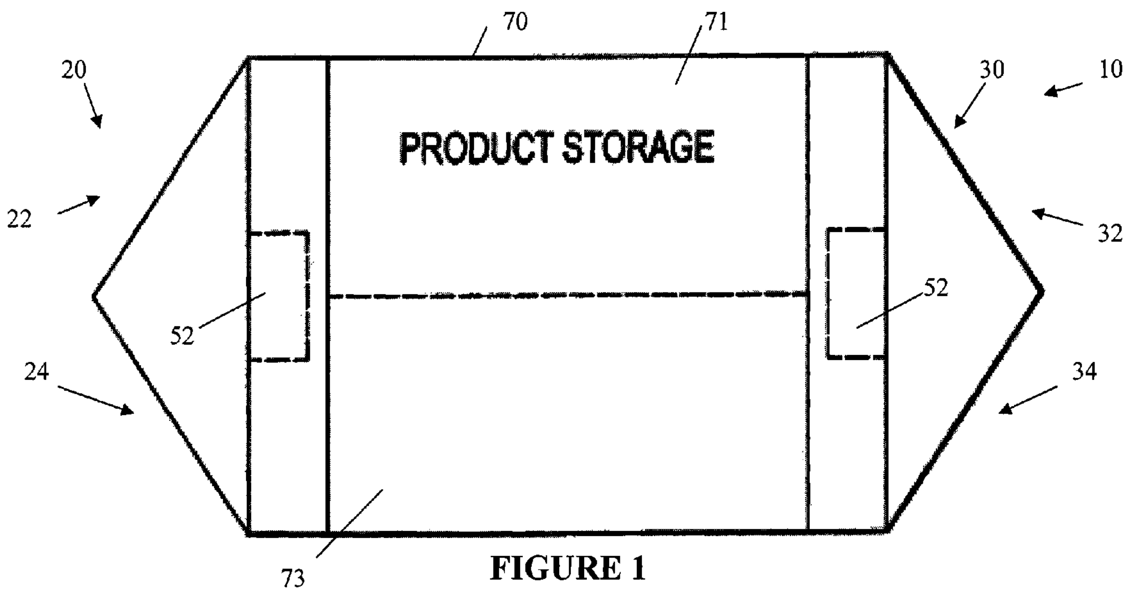
FIG. 1 is a top plan view of the vending machine in accordance with the preferred embodiment of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Turning to the drawings, FIG. 1 shows a vending machine 10 in accordance with a preferred embodiment of the invention. The vending machine 10 includes a housing 70 and a plurality of dispenser slots 52 positioned about the housing 70. The housing 70 has a product storage compartment 71 where the product to be vended is stored, such as beverages, sundries, packaged goods or food. The product storage compartment 71 is preferably at the center of the vending machine 10, though can be at any suitable location.

The housing 70 also includes electronics 73 used to control the operation of the vending machine 10. The electronics can include, for instance, a processor, user input or interface 25, 27 (FIG. 1), wireless communications devices, memory or storage devices, or the like, which are controlled by software stored in the storage device. The electronics 73 can be at a separate compartment or just a section of the inside of the housing 70, and can be at the center of the vending machine, or at any other suitable location. The processor can process an order and also include a (wired or wireless) transmitter/receiver to allow the processor to communicate with other vending machines 10, the fueling stations, or one or more central controllers. The processor controls the operation of the machine, including which side or dispenser slot 52 product is to be delivered to. The processor may include ancillary support elements, such as a memory device (e.g., database or storage device) to record transactions and store product information (e.g., price, picture of product, size information, nutrition information, serving size, manufacturer, etc.).

The machine 10 may have a single control board (i.e., processor) for all sides of the machine that would integrate with a central controller to process the transaction. The central controller can then sum the gas transaction and the vended transaction as one total transaction or just report back to the central controller. This would wirelessly or hard wire, integrate the individual gas purchase transaction with the vended item transaction. The vending surfaces may have the ability through the central controller of the vending machine, to send multi-media or prompt the consumer with questions.

Figure 2:
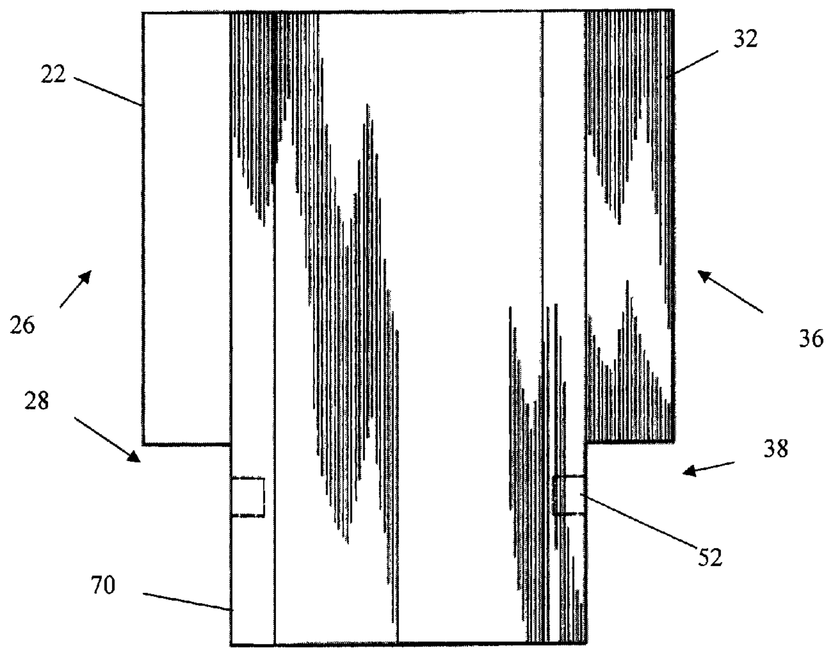
FIG. 2 is a side plan view of one side of the vending machine of FIG. 1.

The housing 70 is shown having a first side 20 and a second side 30 opposite the first side 20. The first side 20 has two user interface panels 22, 24, which are associated with a first dispenser slot 52. And, the second side 30 has two user interface panels 32, 34, which are associated with a second dispenser slot 52. As best shown in FIG. 2, the user interface panels 22, 24, 32, 34 are at a respective top portion 26, 36 of the housing 70, and the dispenser slots 52 are located at a respective bottom portion 28, 38 of the housing 70. In the embodiment of FIG. 2, the bottom portion 28, 38 accounts for approximately the lower one-third of the housing 70, and the top portion 26, 36 is about the upper two-thirds of the housing 70.

Figure 3:
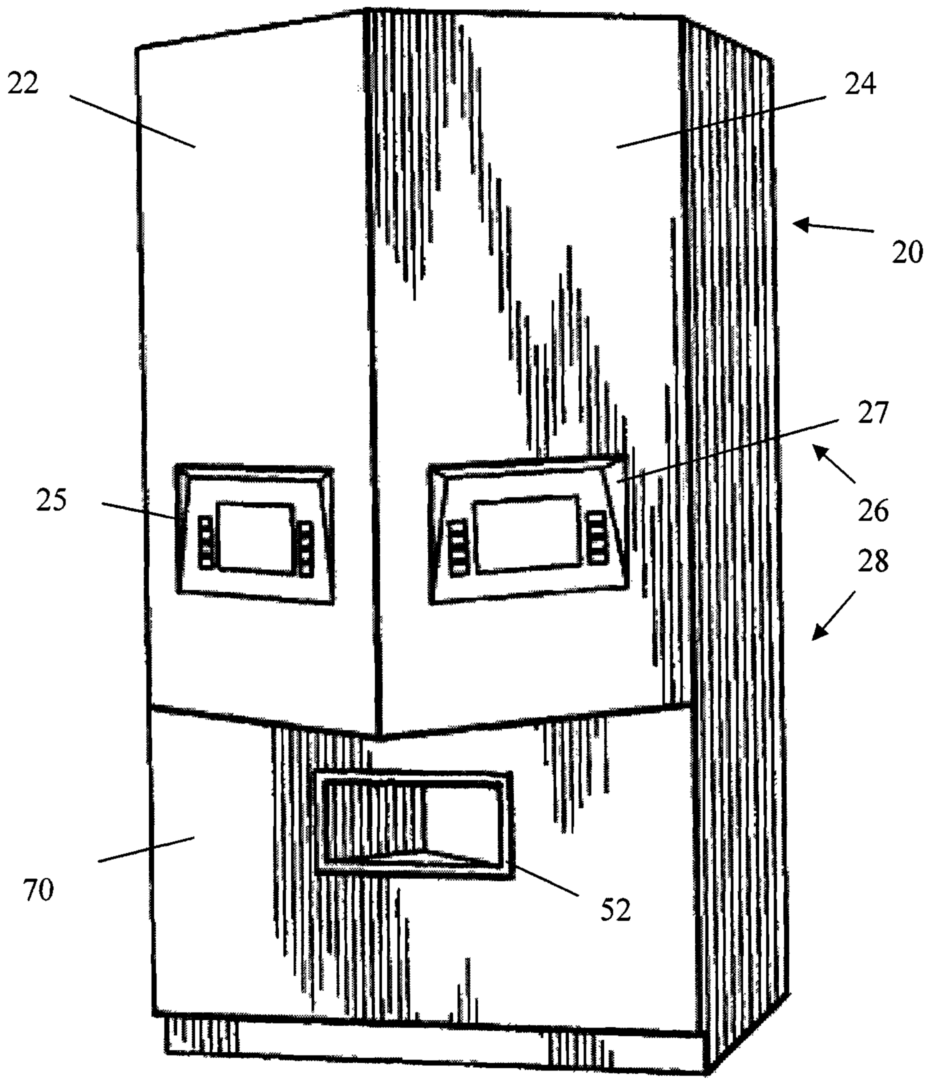
FIG. 3 is a front perspective view of the vending machine of FIGS. 1 and 2.

Referring to FIGS. 1-3, the user interface panels 22, 24 project outwardly from the first side 20 of the vending machine 10, with respect to the bottom portion 28 of the housing 70. The user interface panels 22, 24 form a triangular shape with the bottom portion 28. Thus, the first user panel 22 faces in a first direction and the second user panel 24 faces in a second direction which is substantially perpendicular to the first direction. The panels 22,2 4 form an angle of approximately 80-140 degrees, though any suitable configuration can be utilized.

Turning to FIG. 3, each user panel 22, 24 has a respective user interface 25, 27, though any suitable number of user interfaces can be provided. The user interface 25, 27 communicates with the electronics 73, and is controlled by the processor. The user interface 25, 27 allows a user to view product information, view price information, order and pay for product stored in the product storage 71. The user interfaces 25, 27 include at least a display, input (keypad), and/or money slot, credit card reader. One such payment and control system is shown, for instance, in U.S. Pat. No. 6,517,368, which is hereby incorporated by reference.

Thus, the panels 22, 24 are angled outward so that more than one user can order product from the first side 20 of the vending machine 10. Thus, two users can simultaneously order and pay for product from each side 20, 30, so that a total of four users can order and pay for product at the same time in the embodiment of FIGS. 1-3. Each of the user interfaces 25, 27 cause product to be pulled from the same product storage compartment 71.

The user interface panels 32, 34 at the second side 30 of the machine 10 are similar to the user interface panels 22, 24 at the first side 20 of the machine 10, and their description is not repeated here for the sake of clarity and brevity. The user interface panels 32, 34 are also associated with respective user interfaces (not shown) and with a single dispenser slot 52, and retrieve product from the same product storage compartment 71 as the user interfaces 25, 27 at the first side 20 of the machine 10. Product ordered from the first side 20 (i.e., from either of the two user interfaces 25, 27) are delivered to the dispenser slot 52 located at the first side 20, and product ordered from the second side 30 (i.e., from either of the two user interfaces) are delivered to the dispenser slot 52 located at the second side 30. Since the bottom portion 28, 38 of the vending machine 10 do not project outward, the dispenser slot 52 is easy to access from either of the user interface panels 22, 24, 32, 34 located on that respective side 20, 30 of the vending machine 10. In addition, the dispenser slot 52 at the first side 20 of the vending machine 10 faces in an opposite direction from the dispenser slot 52 at the second side 30 of the vending machine 10.

Figure 4:
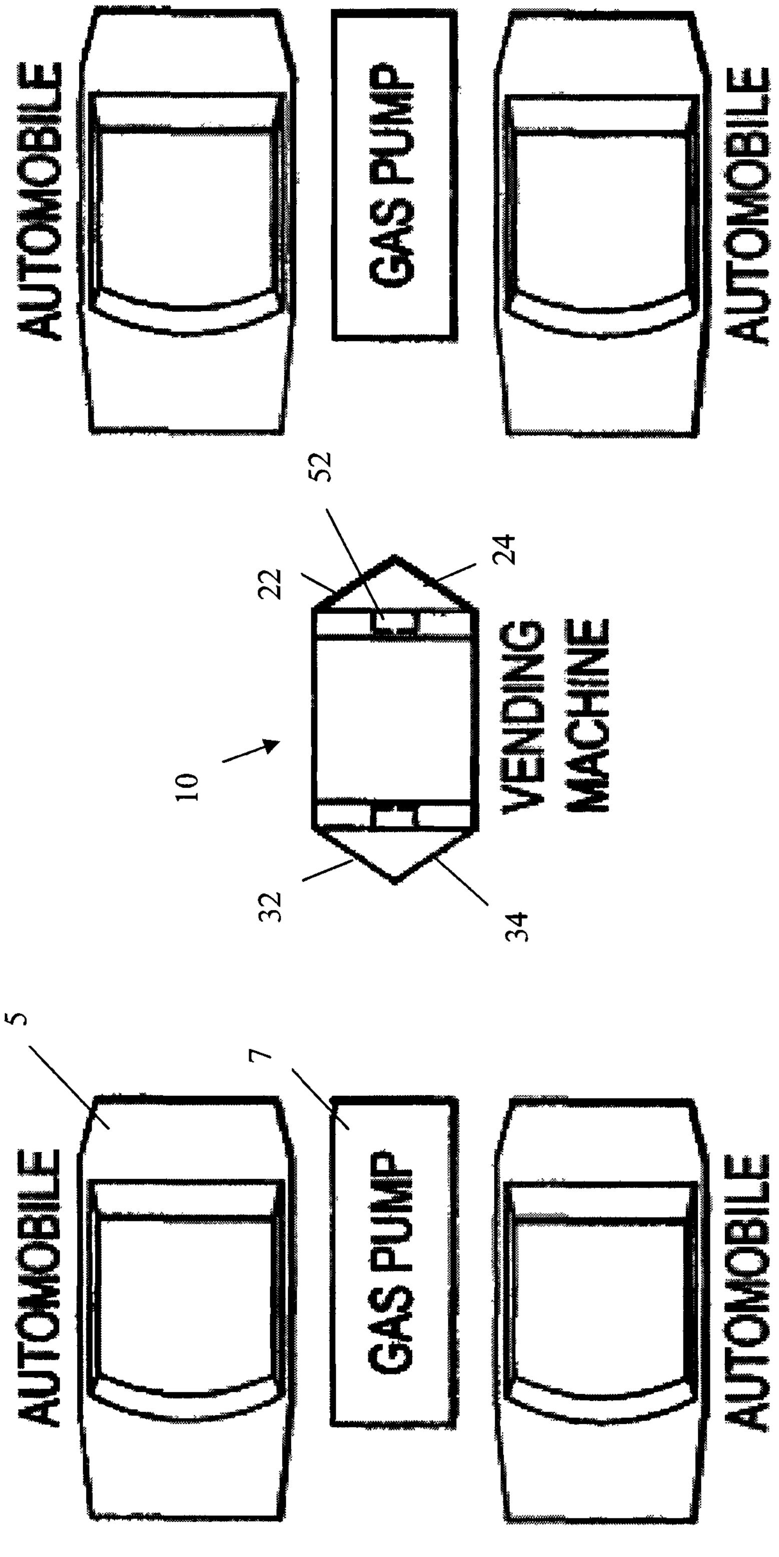
FIG. 4 is a top plan view of the vending machine of FIGS. 1-3 located at a fuel station.

FIG. 4 shows the multi-sided vending machine 10 of FIGS. 1-3 utilized at a convenience store or fueling station, where multiple fueling or pumping stations 7 access the same machine 10. As shown, the convenience store or fueling station has two double-sided gas pumping stations 7 in a row, so that it is possible to simultaneously fuel four independent vehicles 5 at the same time. A single vending machine 10 is provided in the middle of the two pumping stations 7, so that all four vehicles can access one centrally located vending machine 10 which is at a convenient location.

The user interface panels 22, 24, 32, 34 substantially face the respective vehicles 5 for ease of viewing and ordering. That is, the first side 20 of the vending machine 10 faces the first pumping station 7, and the second side 30 of the vending machine 10 faces the second pumping station 7. In addition, the first user interface panel 22 faces one side of the first pumping station 7 and the vehicle 5 positioned at that side of the first pumping station 7, while the second user interface panel 24 faces the opposite side of the first pumping station 7 and the vehicle 5 positioned at that opposite side. And, the second user interface panel 32 faces one side of the second pumping station 7, while the second user interface panel 34 faces the opposite side of the second pumping station 7. Accordingly, each user interface panel 22, 24, 32, 34 of the vending machine 10 faces the vehicles 5 as they are being fueled, for easy access, visibility of product, and convenience of ordering.

Figure 5A:
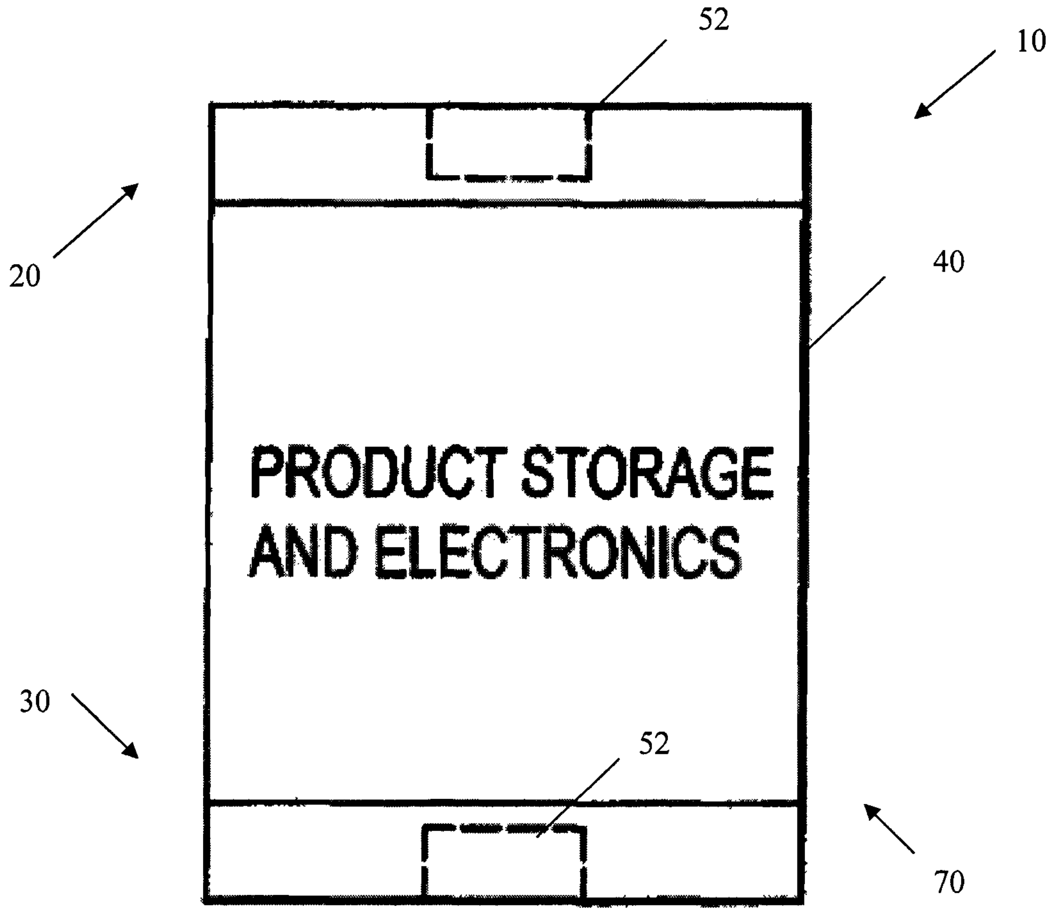
FIG. 5(*a*) is a top plan view of a vending machine in accordance with an alternative embodiment of the invention.
Figure 5:
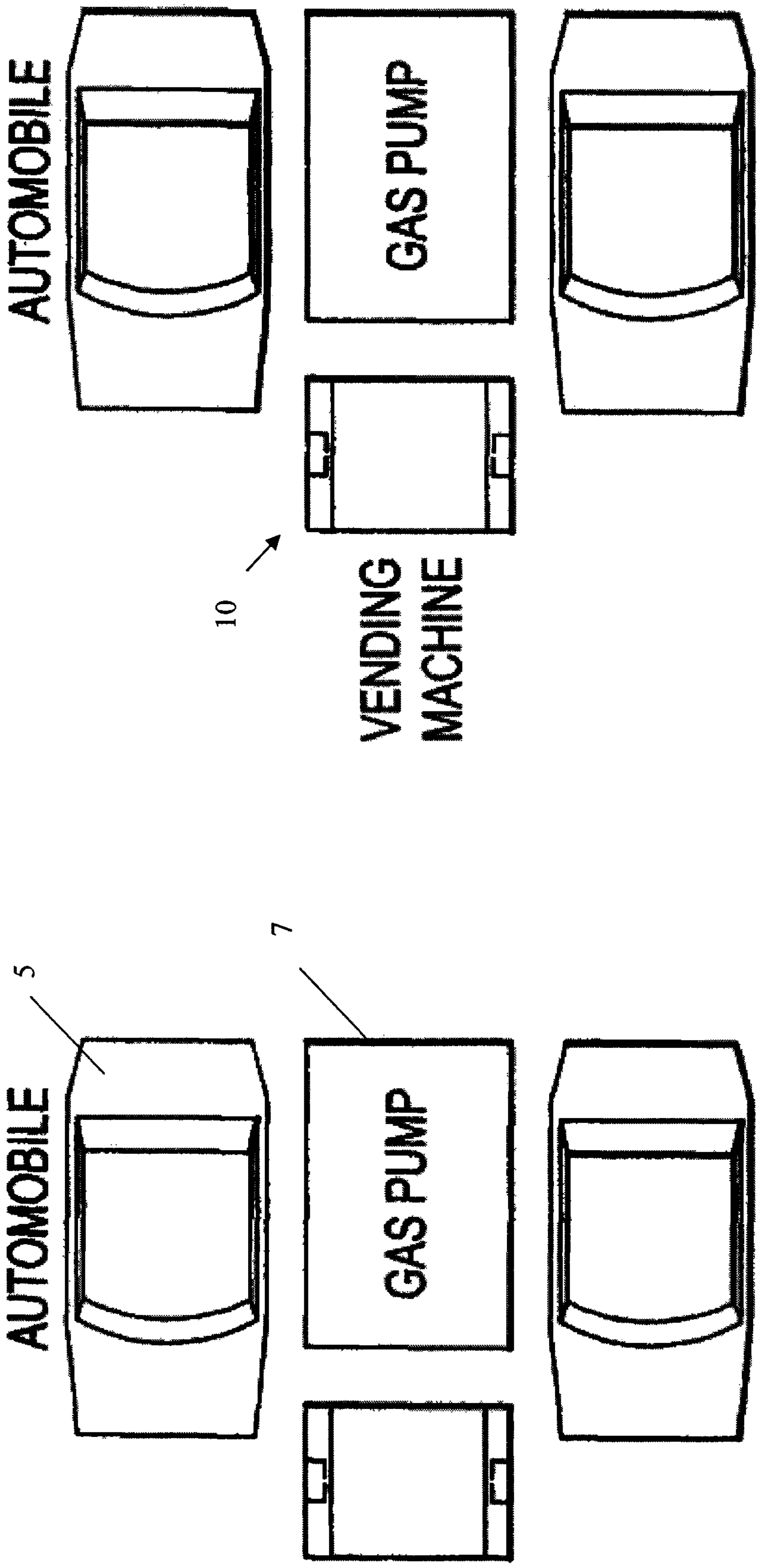

Turning now to FIG. 5(*a*), an alternative embodiment of the invention is shown. Here the vending machine 10 is substantially similar to the vending machine 10 shown in FIGS. 1-4, except without the user interface panels 22, 24, 32, 34. Accordingly, the vending machine 10 of FIG. 5(*a*) preferably has a single user interface on each of the two opposing side 20, 30 of the machine 10. Or, if the vending machine 10 is sufficiently wide, multiple user interfaces and/or dispensing slots 52 can be provided on each side 20, 30 of the machine 10.

FIG. 5(*b*) shows the vending machine 10 of FIG. 5(*a*) implemented at a fueling station similar to the fueling station of FIG. 4. Here, each gas pumping station 7 has its own vending machine 10. The first side 20 of each vending machine 10 faces in the same direction as a first side of the respective gas pump 7, and the second side 30 of each vending machine 10 faces in the same direction as the second side of the respective gas pump 7. Accordingly, each side 20, 30 of the vending machine 10 faces the vehicles 5 as they are being fueled, for easy access, visibility of product, and convenience of ordering.

Figure 6A:
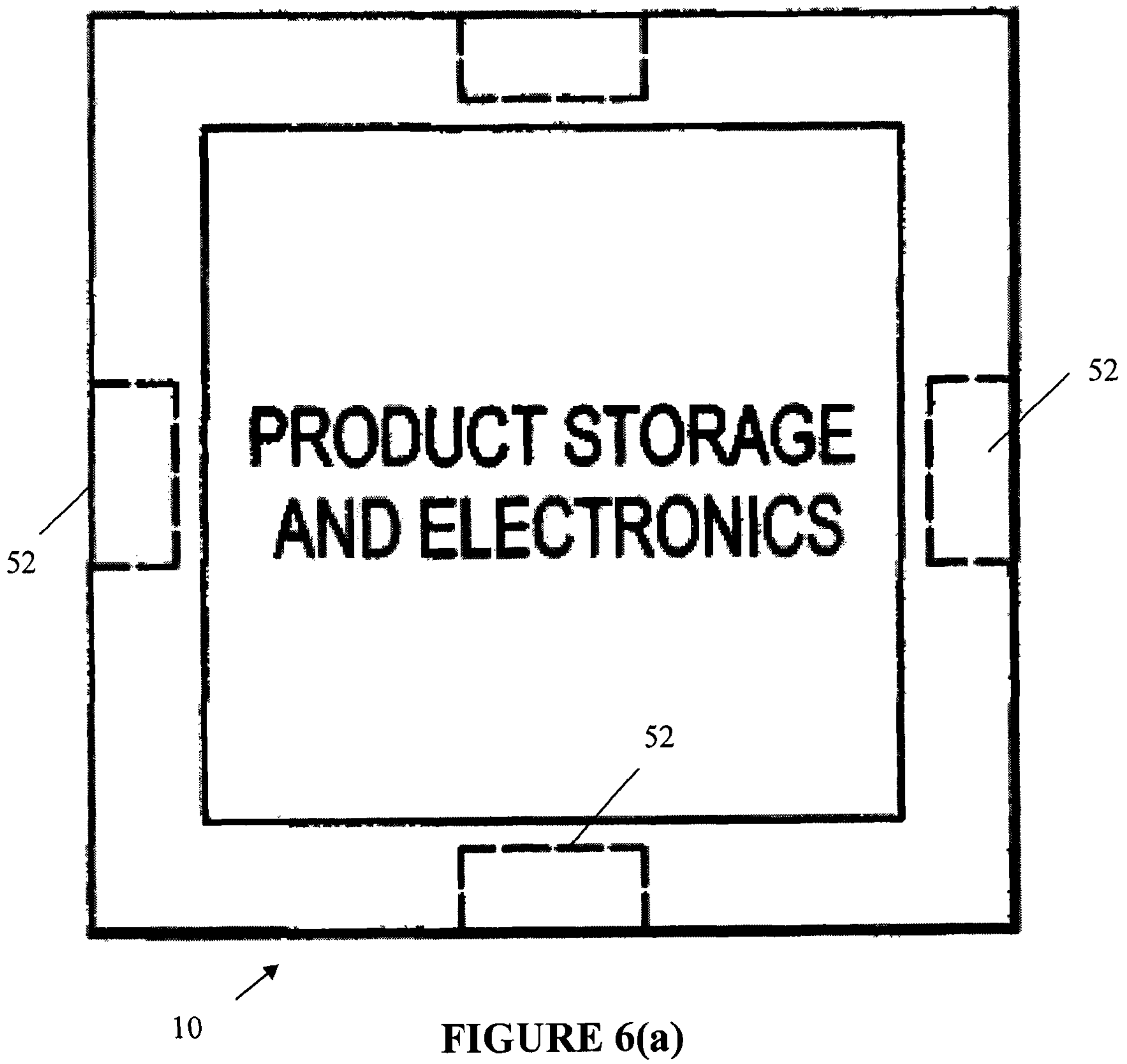
FIG. 6(*a*) is top plan view of a vending machine having a dispensing slot on each of four sides, in accordance with an alternative embodiment of the invention.
Figure 6B:
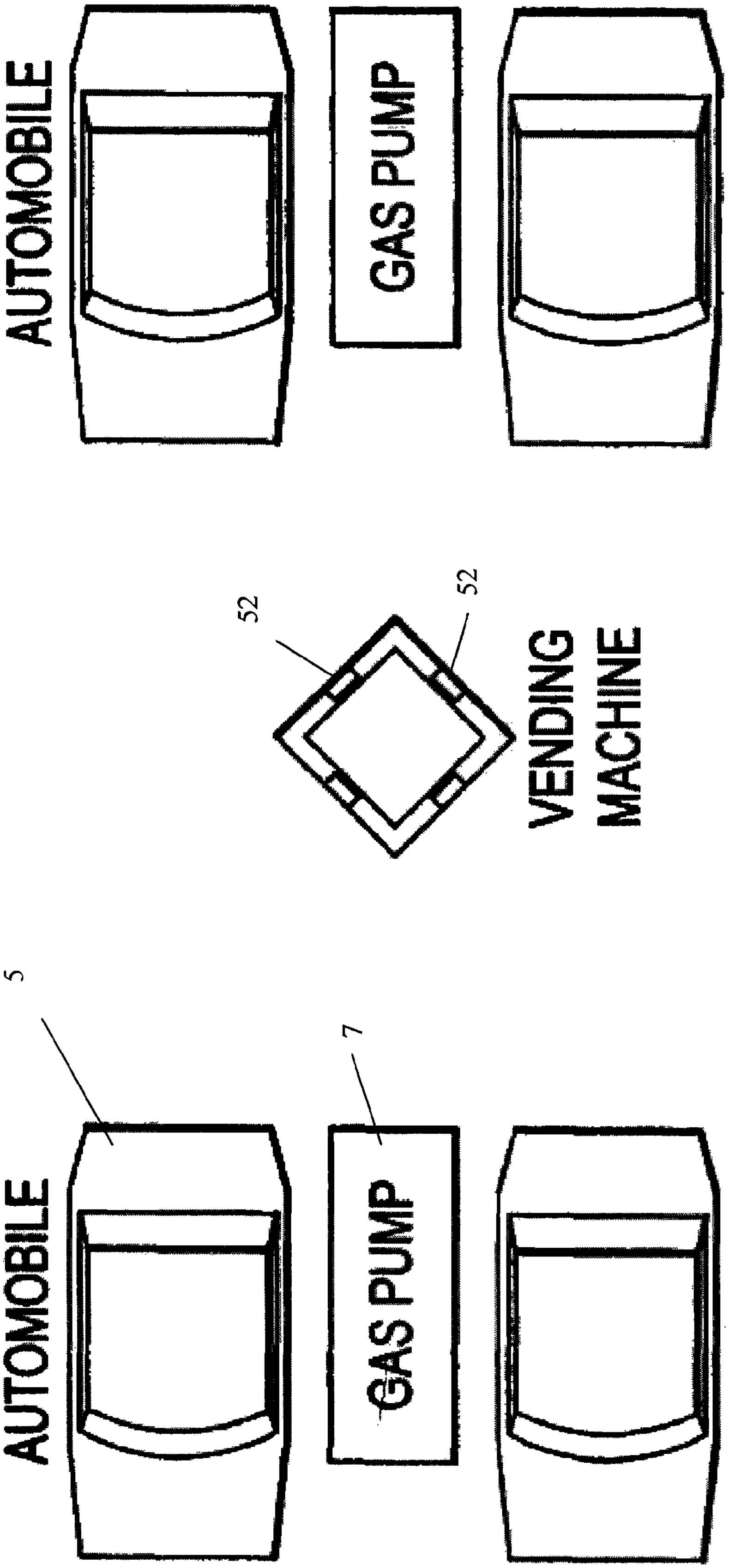

FIG. 6(*a*) shows another embodiment of the invention, in which the vending machine 10 has a square shape with four sides, similar to the vending machine of FIG. 5(*a*). In the present embodiment, each side has a user interface and a dispensing slot 52, whereas the vending machine of FIG. 5(*a*)

only has a user interface and dispensing slot 52 on two of the sides. It should be appreciated, however, that any suitable number of sides can be provided with one or more user interfaces and/or dispenser slots, and that not an equal number of user interfaces and dispenser slots needs to be provided on each side. In addition, the dispenser slot need not be provided on the same side as the user interface. For instance, user interfaces can be provided on the two opposing sides 20, 30 of the vending machine 10 of FIG. 5(*a*), and one or more dispensing slots 50 can be provided on a third side.

Turning to FIG. 6(*b*), the four-sided vending machine 10 of FIG. 6(*a*) is shown at a fueling station having two gas pumps 7. Each of the four sides faces a respective one of the vehicles 5. That is, a first side faces a first vehicle on a first side of the first gas pump 7, and a second side faces a second vehicle on a second side of the first gas pump. A third side of the machine 10 faces a first side of the second gas pump 7, and the fourth side of the machine 10 faces the second side of the second gas pump 7.

Turning to FIGS. 7-10, a preferred embodiment of the product dispensing or delivery system 50 is shown and described. It will be appreciated, however, that any suitable product delivery system 50 can be utilized with the vending machines of FIGS. 1-6, without departing from the spirit and scope of that aspect of the invention. For instance, this mechanism may use a depository shoot system, mechanical arm system or a preferred distribution system.

The product delivery system 50 shown in FIGS. 7-10, can be implemented in either of the two-sided vending machines 10 of FIG. 1-4 or 5(*a*), (*b*). Here, the vending machine 10 has a common product storage compartment 71 for products that can be dispensed from the two (opposing) sides 20, 30 of the vending machine 10. The storage compartment is located at the top portion 26, 36, and the product delivery system 50 is located toward the bottom portion 28, 38 of the vending machine 10.

Figure 7:
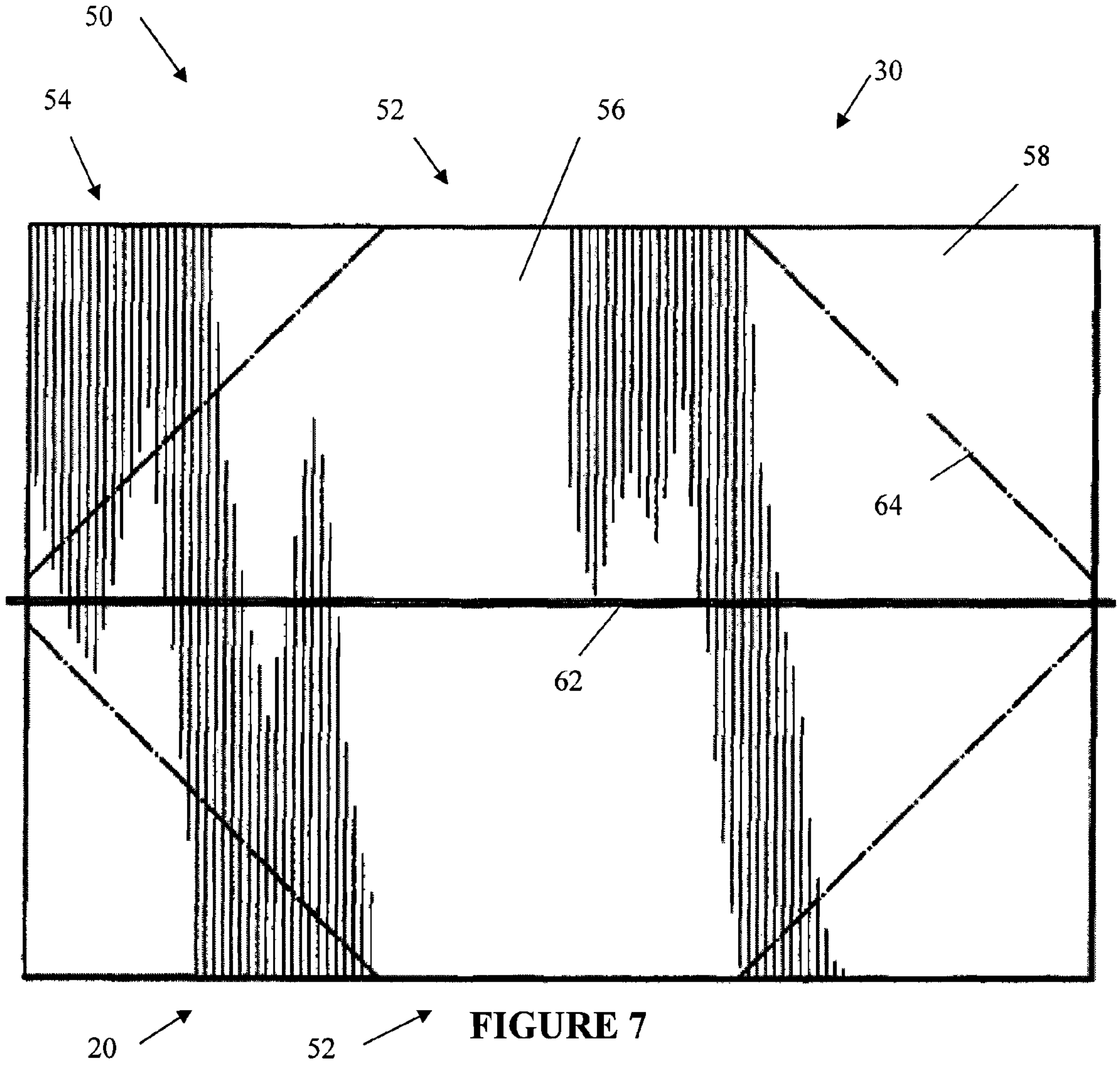
FIG. 7 is a top view of a product delivery system utilized with the vending machine of FIGS. 1-5.
Figure 8:
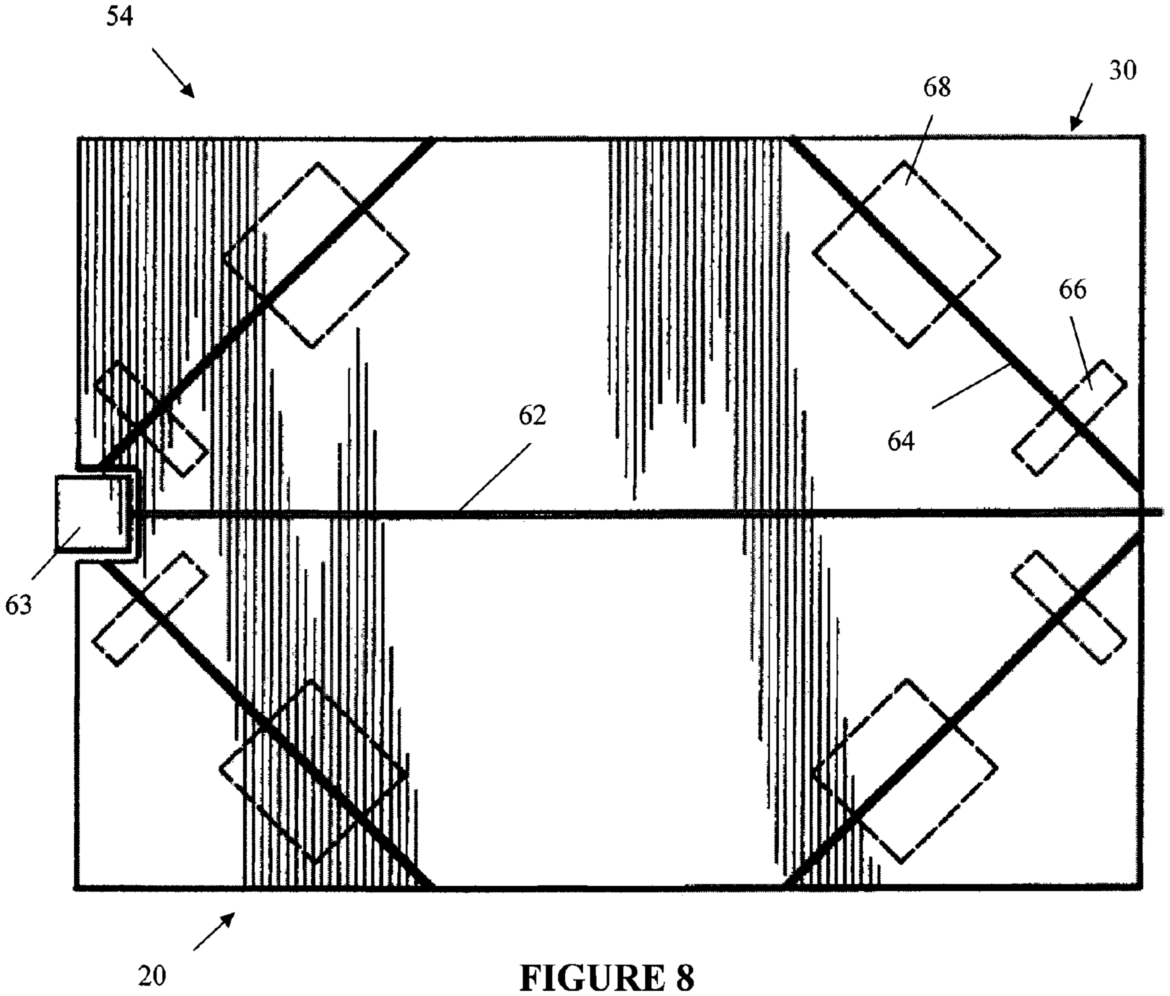
FIG. 8 is a top view of the chute of FIG. 7 showing the hinged connections.

The product delivery system 50 includes a chute 54. As shown in FIG. 7, the chute is a planar plate which can pivot about a central bar 62. The chute 54 has a middle portion 56 and a wing portion 58 located at the corners of the chute 54. The wing portions 58 are substantially triangular in shape. As shown in FIG. 8, the wing portions 58 are connected to the middle portion 56 by unidirectional hinges 68 which are positioned along hinged lines 64. A support element 66 can also be provided to support each of the wing portions 58 so that the wing portions 58 only fold upward, and not downward, at the hinge lines 64. The support element 66 is an elongated, flat plate which is connected to the middle portion 56 and extends under the wing portion 58.

A motor 63 is provided to rotate the chute 50 about the central bar 62 so that the chute is slanted so that the product falls into a bin accessible by the dispenser slots 52 (as generally indicated in FIG. 7), or so that the side of the chute 54 forms the bin, where it can then be retrieved by the user. Thus, the chute 54 seesaws about the central elongated bar 62. The bar 62 can also provide support to the chute 54. However, other configurations can be provided without the central bar 62, such as gears located at the ends of the chute.

Figure 9:
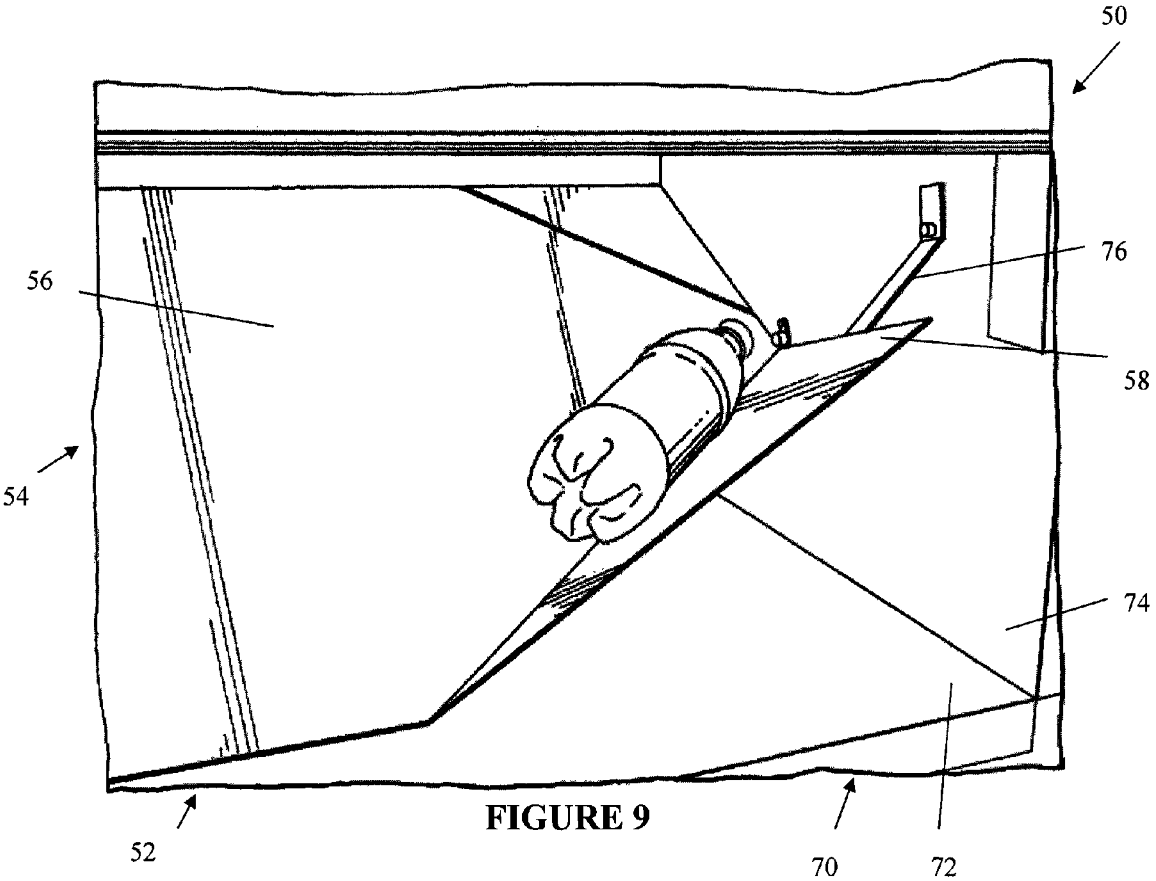
FIG. 9 is a perspective front view of the inside of the vending machine with the product delivery system of FIGS. 7-8.

Referring to FIG. 9, the chute 54 is located in the housing 70 of the vending machine 10. A front panel of the housing 70 is removed to show the details of the dispensing system 50. The inside of the housing 70 has a bottom floor 72 and side walls 74. A post 76 is connected from the side wall 74 to the bottom floor 72. The post 76 extends diagonally, so that it is aligned to be substantially parallel to the hinged folding axis 64 of the chute 54. Thus, the post 76 comes forward toward the front face of the housing, from where it is connected to the side wall 74 to where it is connected to the bottom floor 72. The post 76 is configured to come into contact with the wing portions 58 of the chute 54 as the chute 54 is rotated downward with respect to that side of the vending machine 10.

Figure 10:
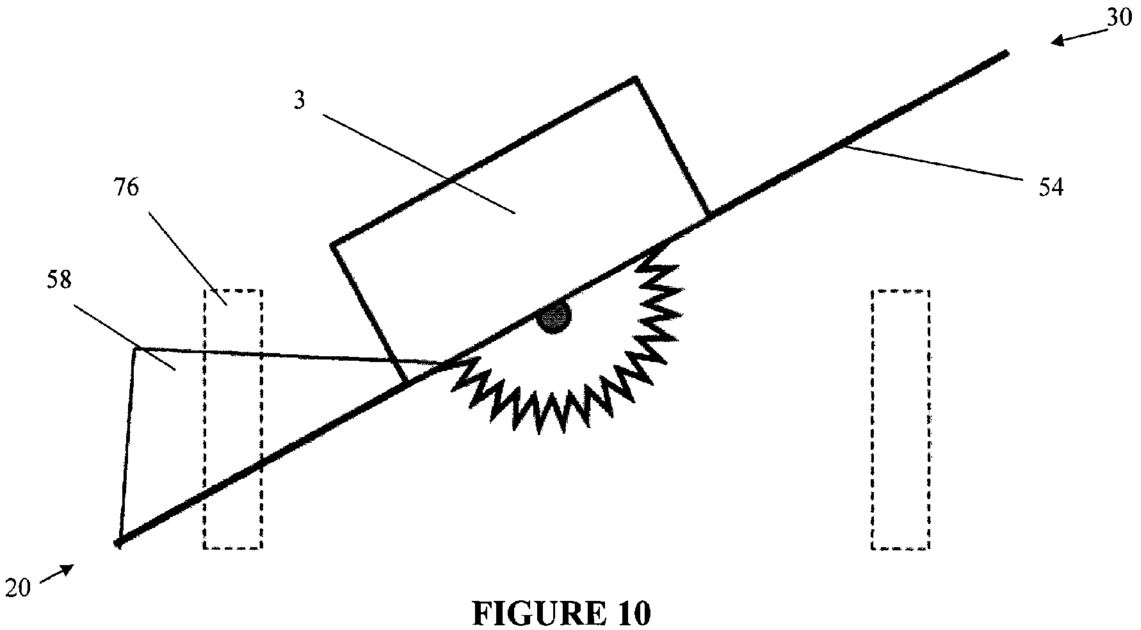
FIG. 10 is a side view of the product delivery system of FIGS. 7-9.

As best shown in FIG. 10, the chute 54 can be moved downward at the first side 20 of the vending machine 10, or at the second side 30 of the vending machine. In the current embodiment, the chute 54 is rotated downward toward the first side 20 of the machine 10. The chute 54 is rotated by the motor 63 (FIG. 8) which may optionally be connected through a series of gears or rack and pinion. As the chute 54 moves downward, the two wings 58 on that side of the chute 54, each comes into contact with one of the two stationary posts 76 on the first side 20 of the housing 70. The posts 76 cause the wings 58 to rotate upward about the hinges 68 and the hinged axis 64, with respect to the middle portion 56 so that the middle portion 56 and those wing portions 58 are no longer planar with respect to one another.

When the chute 54 is rotated downward at the first side 20, the product slides down the chute 54. By rotating the wing portions 58 upward, the product is directed inward toward the center of the first side 20 of the chute 54 so that the product can be delivered in the bin of the dispensing slot 52. The brackets 76 also block any product from falling outside of the chute 54.

As the chute 54 moves downward at the first side 20, it rotates upward at the second side 30 of the vending machine 10. Thus, the wings 58 on the second side 30 of the chute 54 do not come into contact with the posts 76 and therefore stay planar with the middle portion 56. Since the hinges 68 are unidirectional, the only permit the wings 58 to rotate upward with respect to the middle potion 56, and not downward with respect to the middle portion 56.

Accordingly, the chute 54 can be rotated to dispense product from either the first side 20 or second side 30 of the vending machine 10. Once the user makes a selection via the user interface 25, 27, the electronics 73 operate the motor 63 to rotate the chute 54 so that the product will be dispensed on the side 20, 30 of the vending machine 10 where the product was purchased. It can take the chute approximately 1-1.5 seconds to be fully rotated to the selected side. As the chute 54 rotates, the wing portions 58 contact the posts 76, and the posts 76 raise the wing portions 58. After the chute 54 has been fully rotated, a product is released from the storage compartment 71 and falls down until it hits the chute 54. The product will then slide down the chute 54 and is guided by the wing portions 58 into the dispenser slot 52. Once the product is removed, the chute 54 can be returned to the initial horizontal position. As the chute 54 is raised, the wing portions 58 return to be planar with the middle portion 56. In the event that two buyers make a simultaneous or nearly simultaneous selection, one product will be dispensed, the chute 54 is returned to the ready horizontal position and then rotates to the other side before the next product is released.

Though the product delivery system 50 has been illustrated for use with two dispenser slots 52 located on opposite sides of a rectangular vending machine 10, other suitable configurations can be utilized. For instance, the chute 54 can be configured so that it can be rotated along two perpendicular axes. That is, in the embodiment of FIGS. 7-10, the chute can rotate front-to-back and left-to-right, so that product can be dispensed at up to four sides of a rectangular vending machine 10. And, the dispensing slots 52 need not be opposite one another, but can be at various angles to each other.

Figure 11:
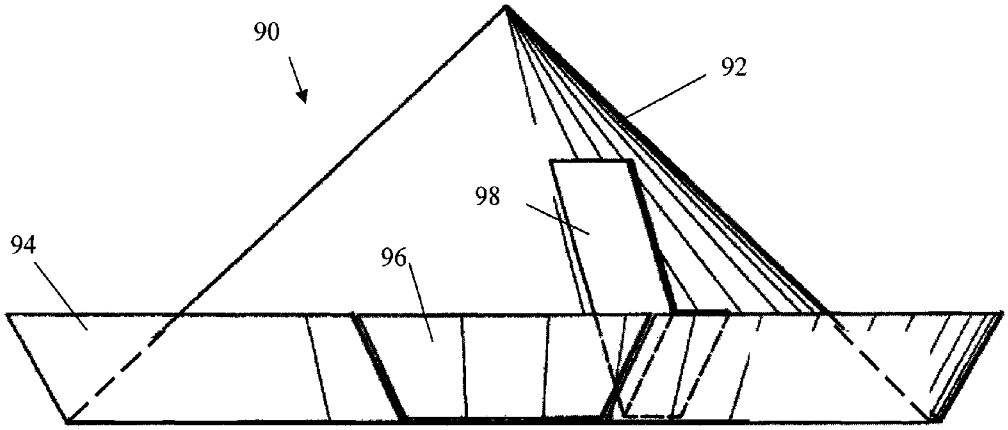
FIG. 11 is a side view of a product delivery system in accordance with an alternative embodiment of the invention, for use with any of the vending machines of FIGS. 1-6.
Figure 12:
FIG. 12 is a top view of the product delivery system of FIG. 11.

Turning to FIGS. 11-12, another product delivery system 90 is shown. Here, the system 90 has a central cone-shaped rotating chute 92, side wall 94, door 96, and arm 98. The top of the chute 92 can be pointed, as shown, or be slightly rounded or even flat. But, the top of the chute 92 should be capable of allowing product to slide down the chute 92 without the product getting stuck at the top of the chute 92 and without damaging the product. The side wall 94 is positioned circumferentially about the base of the chute 92, and may be vertical or face slightly inward or outward (as shown). The inside surface of the side wall 94 can have a bumper to cushion product which slides down the chute 92 and impacts the side wall 94. The bumper can be made of rubber or an elastomeric material which cushions the impact, but also allows the product to slide along the wall to the door 96.

One or more doors 96 are provided in the side wall 94. The doors 96 are each aligned with a respective dispenser slot 54. The door 96 can be opened and closed by a motor or actuator, and can be recessed within an opening of the side 94 when opened or can be on the outside of the side wall 94 so it can slide open. However, the door 96 is configured so that it does not impede the motion of product on the rotating chute 92 when the door 96 is closed. When the door 96 is open, product can be retrieved from the chute 92 through the dispenser slot 52, or the product can fall into a bin where it can be retrieved from the dispenser slot 52.

In addition, an arm 98 may optionally be provided to stop the product at the door 96 and guide product into the bin of the dispenser slot 52. The arm can rotate up and down to selectively guide product into the desired dispenser slot 52. Accordingly, multiple doors 96 and arms 98 are provided along the circumference of the side wall 94. Thus, product can be directed to any suitable number of dispenser slots 52 at any side or position of the vending machine 10. The product delivery system 90 allows the vending machine housing 70 to have any suitable shape, such as rectangular, circular or triangular.

In operation, a user selects a product from the user interface 25, 27. At that point, the chute 92 begins to rotate. Also, the door 96 located at the dispenser slot 52 associated with (i.e., closest to) the operated user interface 25, 27, is opened, and the respective arm 98 swings open over the chute 92. The product is then released, and it drops onto the chute 92. The product comes to rest on the side wall 94, and slides along the side wall 94 until it comes to the open door 96. The arm 98 ensures that the product does not travel past the open door 96, but rather that it is guided into the opening in the side wall 94 formed by the opened door 96. The product can then drop into the bin or otherwise be retrieved by the user. The system can further detect that the product has arrived at the appropriate dispenser slot 52, and stop the chute 92 from rotating before the user is able to retrieve the product, to avoid any possibility of injury.

In accordance with the preferred embodiment of the invention, the door 96 is approximately 8-10 inches in length. The sides of the opening in the side walls 94 can be angled, so that product does not get caught on the side walls 94. The side wall (or lip) is about 2-3 inches in height. Of course, any suitable sizes and dimensions can be provided. In addition, although the chute 92 is shown as having a cone-shape, any suitable shape can be used, such as having multiple flat sides (such as a pyramid shape having four sides). In addition, where multiple flat sides are provided, each side can be aligned with a respective delivery slot 52 and the product can be dropped on a particular side by an elongated chute arm with raised sides. The arm can be moved to the desired side of the chute (which is fixed and does not rotate), and the product dropped on that side of the chute.

Alternatively, the chute 92 can have ribs extending upward from the surface of the chute 92. The ribs can be elongated and extend from the base of the chute 92 to the top of the chute 92. Or, smaller elongated ribs can be alternately positioned along the surface of the chute 92, which only extend a portion of the distance from the base to the top of the chute 92. The ribs can be offset from each other. Or, the ribs can be provided at the base portion of the chute 92, and extending only a portion upward on the chute 92. The ribs assist in moving the product in the direction of the chute 92.

Another optional feature of the invention is to provide sensors at the base portion of the chute 92 to detect the location of the product, and to move the chute 92 to be aligned with the desired dispenser 52. The door 96 can then be opened, and the product made accessible to the buyer.

It should be noted that the product delivery systems 50, 90 can be integral with the vending machine housing 70, or it can be a separate unit which slides into an existing vending machine housing 70, whereby for the system 50 of FIGS. 7-10, the bottom floor 72 and the side wall 74 are part of the product delivery system 50 housing. In addition, the chutes 54, 92 are preferably made of a stainless steel or other slippery material which will allow the product to easily slide along the chute 54, 92.

The vending machine processor can be in communication with the fueling stations so that the fuel and vended goods can be purchased at the fueling station together, summed and completed as one transaction. The vending machine can accept payment separate from the fueling station, or dispense product in response to a signal from the fueling station that payment has been received at the fueling station.

Where payment is made at the fueling station, product is preferably dispensed from the side of the vending machine which faces that fueling station. For instance, the fueling station can receive an order from a user for one product X. The fueling station sends a dispense product X command signal to the vending machine, which in turn dispensing the product X. The vending machine can send a confirmation receipt to the fueling station.

Figure 13A:
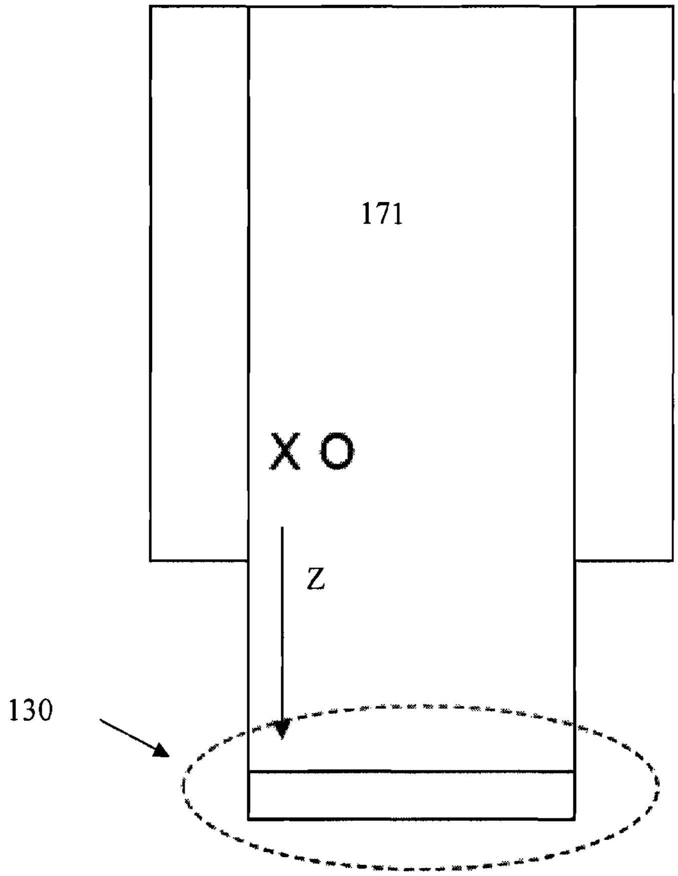
FIG. 13(*a*) is a side view of a product delivery system in accordance with another embodiment of the invention, for use with any of the vending machines of FIGS. 1-6.
Figure 13B:
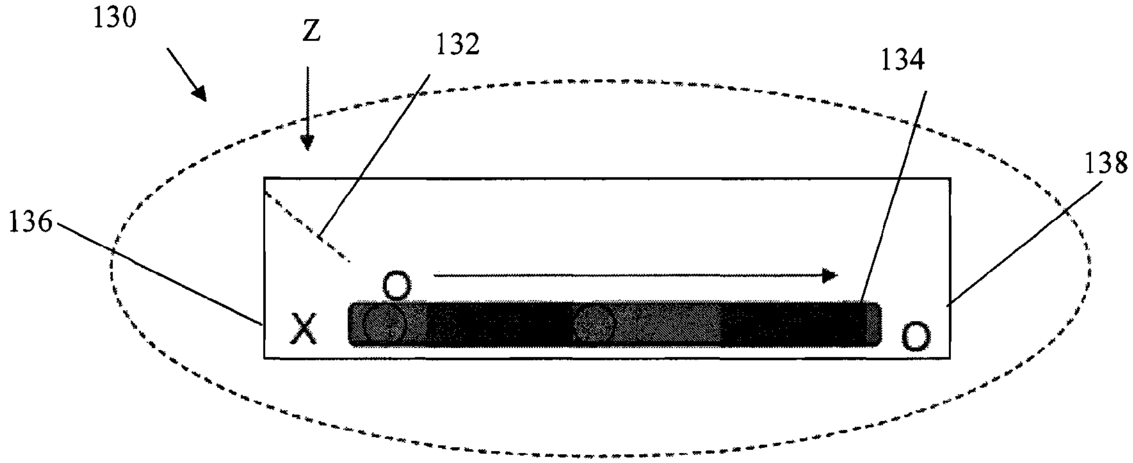
Figure 13C:
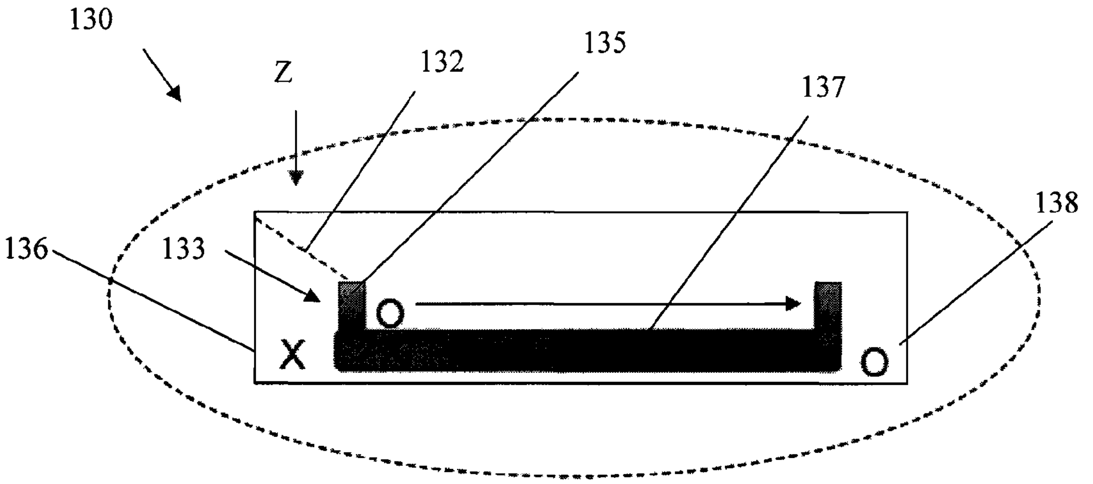

In FIGS. 13(*a*), (*b*), another preferred embodiment of a product delivery system 130 is shown. In FIG. 13(*a*), the vending machine is shown cut off at the product delivery system 130. The vending machine would be placed on a module or pedestal so that the product delivery system 130 and dispenser slots 136, 138 are above 18 inches from the ground, as further discussed below.

Referring to FIG. 13(*a*), product X and O are stored in the storage compartment 171. When the user selects a product, it falls down from the storage compartment 171 along the drop zone Z and into the product delivery system 130. Turning to FIGS. 13(*b*), (*c*), the product delivery system includes a deflector 132 and a conveyor belt 134 (FIG. 13(*b*)) or a sweep mechanism 133 (FIG. 13(*c*)). The deflector 132 can be an elongated bar, plate or the like, which extends at least a portion of the width of the vending machine. The deflector 132 is positioned along the path of drop zone Z. The deflector 132 is preferably located at one side (the front side in the embodiment of FIG. 13(*a*)) of the vending machine.

The deflector 132 is normally in a stored position along the inside of the vending machine, so as to not obstruct product released from the storage area 171. When a user selects a product X to be dispensed through the front dispenser 136 located on the front side of the vending machine, the deflector remains in the stored position. Thus, the product X falls into the front dispenser compartment 136, as shown. Now assume that a user selects a product O (which can be the same as product X, but for illustrative purposes is assigned a different reference letter) from the rear of the vending machine. In this instance, the deflector 132 is activated to enter the deflect position. The deflector 132 extends outward into the drop zone Z, as shown in FIG. 13(*b*), and the product O is then released from the storage area 171. As the product falls along path Z, the deflector 132 deflects or guides the product O onto the conveyor belt 134 (FIG. 13(*b*)) or into the path of a sweep mechanism 133 (FIG. 13(*c*)). The conveyor belt 134 is preferably substantially horizontally positioned and extends from the front of the vending machine to the rear of the vending machine, though preferably does not enter into the dispenser slots 136, 138. The conveyor belt 134 carries the product O to the rear dispenser slot 138 at the rear of the vending machine, where it can then be retrieved by the user.

The storage compartment 171 is preferably located at the middle and/or top of the vending machine, so that product can be released into the front dispenser slot 136. The deflector is preferably located just above the front dispenser slot 136 so that product does not bounce back into the front dispenser slot 136. The conveyor belt 134 has rotation wheels that are operated to move the conveyor belt 134. The conveyor belt 134 is preferably turned ON and the deflector plate 132 is extended to the deflect position, before the selected product is released from the storage compartment 171 to ensure that product that is intended to be dispensed from the rear dispenser slot 138 does not enter the front dispenser slot 136.

Instead of a conveyor belt 134, any suitable transport device can be provided. For instance as shown in FIG. 13(*c*), a sweep mechanism 133 can be provided which pushes or sweeps the product O to the rear dispenser slot 138 at the rear of the vending machine, where it can then be retrieved by the user. The sweep mechanism can comprise, for instance, an elongated arm 135 that extends at least partially across the width of the vending machine, as shown. The arm 135 is preferably substantially parallel to the front and rear of the vending machine and perpendicular to the sides of the vending machine, and rides in guide tracks positioned along opposite sides of the vending machine. However, other configurations for the arm 135 can be used. For instance, the arm 135 can extend out from a central support beam that connects to a single track in the center of the arm. Or, the drop zone Z can be at a side of the vending machine and the arm can pivot about a single connection point similar to a windshield wiper.

As further shown in FIG. 13(*c*), the arm 135 of the sweep mechanism 133 is initially positioned just below the deflector 132. The deflector 132 directs the falling product over the arm 135 to the rearward facing side of the arm. A motor moves the elongated arm 135 from the front of the vending machine to the rear of the vending machine, as shown, so that it carries the product O from the deflector 132 at the front of the vending machine, to the rear dispenser slot 138. The arm 135 is sufficiently tall to ensure that the product does not slip over the top of the arm. And, it is also sufficiently close to the bottom floor 137 (which can be elevated with respect to the dispenser slots 136, 138, as shown) of the vending machine to ensure that the product does not slip under the arm 135. A brush or flexible rubber can be provided along the bottom of the elongated arm to further ensure that product does not get caught between the elongated arm and the bottom of the vending machine. The arm 135 can also be angled forward at the bottom to further avoid the product becoming trapped beneath the arm.

The conveyor belt 134 or sweep mechanism 133 need not extend the entire width of the vending machine. Rather, the conveyor belt 134 or sweep mechanism 133 (as well as the drop zone Z and deflector 132) can be slightly wider than the product to be transported. Guide rails or plates can be positioned along the sides of the drop zone Z and the conveyor belt 134 or sweep mechanism 133, to keep the product at the proper location. For instance, guide plates can be positioned along the sides of the conveyor belt 134 or sweep mechanism and angled upward to prevent product from falling off of the conveyor belt 134 or escaping the sweep mechanism.

It should be noted that a deflector 132 is optional. For instance, product can be released at the center of the vending machine, and the conveyor belt 134 or sweep mechanism 133 can selectively operate in both directions to either carry the product to the front or rear of the vending machine. Or, the conveyor belt 134 or sweep mechanism 133 can be positioned in the front dispenser 136 to receive all falling product, and selectively transport product to the rear dispenser 138. In addition, though the conveyor belt 134 or sweep mechanism 133 extends from the front to rear of the vending machine, multiple conveyor belts 134 or sweep mechanisms 133 can be provided that carry product to four or more sides of a vending machine. The conveyor belt 134 or sweep mechanism 133 can be placed at the bottom of the vending machine. The drive mechanism can be placed under the vending machine or at the bottom of the vending machine.

It is further noted that both sides of the vending machine pull product from a single storage compartment 171. This allows the size of the storage compartment 171 to be maximized by only having a single drop zone Z. In addition, only a single product delivery system 130 is needed. And, the same product will be available for purchase at both sides of the vending machine, so that product is not out of stock on one side of the vending machine but available on the other side of the vending machine.

Figure 14:
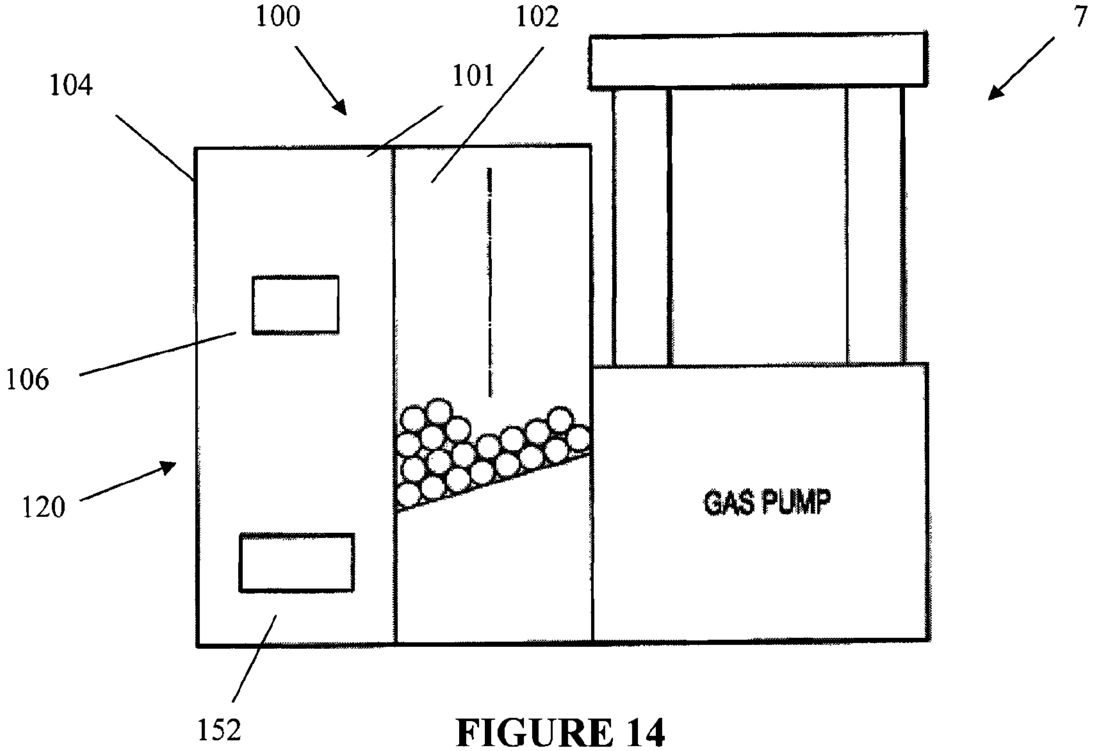
FIG. 14 is a front plan view of a vending machine having storage in Class 1 Division 1 space.

Turning to FIG. 14, a vending machine 100 is illustrated which has multiple classifications according to UL certification. For a gas pump, the first 18 inches from the pump is considered Class 1 Division 2 space. In addition, 18 inches from the ground is also considered to be Class 1 Division 2 space. Beyond 18 inches from the pump, and 18 inches up from the ground, is unclassified space. These spaces have different requirements for explosive proof devices due to possible gasoline vapors that may be present. Accordingly, the vending machine 10 is a multi-UL zoned machine with one zone being in Class 1 Division 2 and one zone being in unclassified space or any combination of class and zones as deemed the specific application.

As shown, the vending machine 100 has a storage side 102 and a dispensing side 104. The storage compartment 102 is positioned closest to the gas pump 7, and accounts for the Class 1 Division 2 space. The electronics cannot be located in the Division 2 space, and is therefore provided in the electronics/dispensing compartment 104, which is outside of the Division 2 space. Accordingly, the Class 1 Division 2 space (storage 102) is primarily used to store product using a shoot/gravity feed system directing the products to the unclassified space (electronics compartment 104). The product is dispensed by controllers (user interface 106), which is provided on the electronics side 104 of the vending machine 100 in the Class 1 Division 2 space. A user interface 106 is preferably provided on the opposite side of the vending machine 10, which is not shown in the embodiment of FIG. 14, but similar to the vending machine 10 of FIGS. 5(*a*), (*b*). This allows the vending machine 100 to be directly beside (either touching or at a minimal distance) the gas pump 7 with the two distinct zones integrally designed into the machine 100 to be compliant with regulations.

The storage zone (or storage side) 102 of the machine (the space which is up to 18 inches from the gas pump) is directly adjacent the gas pump 7, and in the Division 2 space. The dispense zone (or dispense side) 104 is positioned directly adjacent to the storage zone. Though no product is shown in the bottom section of the space, namely the space which is both 18 inches from the ground and 18 inches from the gas pump in the horizontal direction, product could be stored there. And, there are no electronics located at the storage side 102 unless they are rated for Class 1 div 2 space of the machine 100. Electronic gates are provided at the bottom of the shoots in the unclassified space, so that no electronics are in the classified space. Rather, all the electronics are at the dispense side 104 of the machine, in the unclassified space outside of Class 1 div 2 space. Product may be delivered to the consumer in the Class 1 Division 2 space as long as all motors and electric controllers are outside this zone. Any and all electronics, motors, compressors and circuit boards preferably comply with Class 1 Division 2 requirements, even if in outside Class 1 Division 2 space. Otherwise, the electronics are similar to that used in the vending machine 10 of FIGS. 1-12.

Product can be dispensed in the Class 1 Division 2 space, as long as it is not capable of creating a spark, such as for plastic bottles. Of course, any additional space in the outside of Class 1 Division 2 space in the unclassified space which is not needed for the dispensing and electronics, can also be used to store product. Accordingly, the vending machine 100 maximizes the utility of the Class 1 Division 2 space. The storage side 102 and said dispensing side 104 are separate and distinct from each other and form a vertical side-by-side and/or horizontal above-below relationship (i.e., the storage is on the right side in the embodiment of FIG. 14, and the dispenser is on the left side). The two sides 102, 104 are preferably separated by a wall. However, the sides 102, 104 are within the single housing 101. The multi-zoned vending machine can have dispensers 152 on one side 120, as shown in FIG. 14, or on multiple sides, as in the vending machine 10 of FIGS. 1-12.

The dispensing side 104 can employ the product delivery system 50 of FIGS. 7-10, or the product delivery system 90 of FIGS. 11-12, or the product delivery system 130 of FIGS. 13(*a*), (*b*), (*c*). Thus, for instance, the product can fall from the storage area 102 into the chute 54 of the product delivery system 50, which rotates to deliver the product onto the desired side 120 of the machine 100. Of course, any other suitable product delivery system can be utilized in the present embodiment of the invention.

Other features of the invention include the use of separate sealed power supply, and a waterproof junction box for the electrical components. The vending machine 10, 100 may also have a wireless detector to detect the unique signal and/or a unique ID from a wireless phone/device and store this information for future purchases. Or, the machine 10, 100 can have another suitable detector (such as a thumbprint or eye scanner) which detects a unique characteristic of the user. The processor can then generate specific messages (such as coupons or marketing information) to display on the user interfaces 25, 27, and track the purchase history for that user. This would allow the vending machine 10, 100 to prompt the consumer when the signal is detected to purchase the same product while in the area at a future visit, or to otherwise customize the user's experience.

A collective dispensing and control system has a variety of self-service devices that dispense different types of goods. The system has a primary dispenser such as a self-service fuel pump and a secondary dispenser such as a self-service vending machine. A customer enters some form of payment into one of the dispensers, usually the primary dispenser. This can be a credit/debit card, identifiable RF device such as a cell phone or a code given by the facility. Once the method of payment is validated, the primary dispenser together with secondary dispenser(s) associated with the primary dispenser, are activated. Products that are available for purchase from either the primary dispenser or the associated secondary dispensers are displayed to the customer at the primary and/or secondary dispenser. The secondary dispenser can be located beside or between fueling stations and can service multiple fueling locations from one central depository of goods. The standard vending machine has only one interface surface and one location to dispense products.

The vending machine 10 has been described and shown as either having two angled sides 20, 30, each of which projects outwardly (FIG. 1), or having flat sides 20, 30 (FIG. 5(*a*)). However, any combination can be provided to allow the vending machine 10, 100 to interact with multiple customers at a time, while drawing product from one central product storage. The machine can be configured in multiple ways, such as having two interfaces on one surface (i.e., the first side 20 only of FIG. 1), with a flat surface vending interface on the back side of the machine. The vending machine has an internal device which directs the product so that it dispenses in the direction of the customer interface that has requested a product. Another variation is to have both the front and back of the machine have an angled two customer interfaces, creating a four interface machine. All of these variations allow for multiple users to interface with a vendible product that is stored in one central depository.

The cost for the selected products are then totaled by the primary dispenser and a single payment transaction is made, such as by a credit/debit/RFID charge. Alternatively, the cost can be totaled by a separate controller interface. A timeout feature is provided, and the system also allows for remote inventory assessment and pricing. The inventory assessment or stocking request can be transmitted to a remotely-located central facility.

The invention fulfills a need of vending on the gas island. It maximizes the utility of a single vending machine by providing customer interfaces on two or more sides of the machine, and minimizing the number of unused sides. This maximizes the efficiency and reduces the space and power needed to dispense product to multiple users. A single machine can be placed either beside one pump or between multiple pumps and each fueling station can have a dedicated interface to purchase product while reducing the number of machines, energy use of machines and space on the gas island. In addition the vending machine would have an internal/external deflection mechanism to direct the product to the appropriate place in front of the customer who chose that product.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A vending machine comprising:

first and second dispensing sides for dispensing product from the vending machine;

product storage for storing product to be dispensed from the vending machine, wherein the product to be dispensed falls from the product storage along a drop path into a first dispenser at said first dispensing side;

a conveyor belt configured to transport product released from the product storage to a second dispenser at the second dispensing side, or a sweep mechanism configured to push product released from the product storage to the second dispenser at the second dispensing side; and a deflector configured to have a first position that does not extend into the drop path whereby product falls into the first dispenser at the first dispensing side and a second position whereby the deflector extends outward into the drop path to deflect the product onto the conveyor belt or in front of the sweep mechanism to transport the product to the second dispenser at the second dispensing side.

2. The vending machine of claim 1, wherein said first and second dispensing sides are on opposite sides of said vending machine.

3. The vending machine of claim 1, further comprising:

a processor;

at least two display devices communicating with said processor, each of said at least two display devices located at a respective one of said at least two dispensing sides; and at least two input devices communicating with said processor, each of said at least two input devices located at a respective one of said at least two dispensing sides to receive information from a user.

4. The vending machine of claim 1, further comprising a motor for moving said deflector to move between the first and second positions.

5. The vending machine of claim 4, further comprising a processor for controlling the motor to move said deflector between the first and second positions.

6. The vending machine of claim 1, wherein said deflector comprises an arm.

7. A vending machine comprising:

a housing having a first side and a second side;

a first dispenser at the first side of the housing;

a second dispenser at the second side of the housing;

product storage for storing product to be dispensed from the vending machine, wherein the product falls from the product storage along a drop path to said first dispenser;

a transport device configured to deliver the received product to said second dispenser; and a deflector configured to selectively move between a first position that does not extend into the drop path, and a second position that extends into the drop path to deflect the product from the drop path to the transport device to transport the product to the second dispenser.

8. The vending machine of claim 7, further comprising a first user input at the first side of the housing for selecting a first desired product, a second user input at the second side of the housing for selecting a second desired product, wherein said vending machine is configured to deliver the first desired product to the first dispenser and deliver the second desired product to the second dispenser.

9. The vending machine of claim 7, said housing further having a third side and a fourth side.

10. The vending machine of claim 7, wherein said transport device comprises a conveyer belt.

11. The vending machine of claim 7, wherein said transport device comprises a sweeping mechanism that pushes the product.

12. The vending machine of claim 7, further comprising a motor for moving said deflector to move between the first and second positions.

13. The vending machine of claim 12, further comprising a processor for controlling the motor to move said deflector between the first and second positions.

* * * * *